US008842525B2

(12) United States Patent  
Kim et al.

(10) Patent No.: US 8,842,525 B2  
(45) Date of Patent: Sep. 23, 2014

(54) SYSTEM AND METHOD FOR EXTENDING A WIRELESS COMMUNICATION COVERAGE AREA OF A CELLULAR BASE TRANSCEIVER STATION (BTS)

(75) Inventors: John Yongchae Kim, Centreville, VA (US); Joe Martire, Herndon, VA (US); Thuy Thomas Tran, Fairfax, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 1151 days.

(21) Appl. No.: 12/575,691

(22) Filed: Oct. 8, 2009

(65) Prior Publication Data

US 2011/0085492 A1    Apr. 14, 2011

(51) Int. Cl.
*H04W 4/00* (2009.01)
*H04B 7/14* (2006.01)
*H04J 1/10* (2006.01)
*H04J 3/08* (2006.01)

(52) U.S. Cl.
USPC .............................. 370/228; 370/315; 370/338

(58) Field of Classification Search
USPC ......... 370/315, 317, 328, 329, 331, 338, 352; 455/7, 422.1, 434, 435.1, 443, 444, 455/445, 446, 447, 448
See application file for complete search history.

(56) References Cited

U.S. PATENT DOCUMENTS

| | | | |
|---|---|---|---|
| 5,861,844 A | 1/1999 | Gilmore et al. | |
| 5,898,679 A | 4/1999 | Brederveld et al. | |
| 5,907,540 A | 5/1999 | Hayashi | |
| 7,894,402 B2 * | 2/2011 | Gollamudi et al. | 370/335 |
| 8,391,797 B2 * | 3/2013 | Tee et al. | 455/63.1 |
| 8,432,886 B2 * | 4/2013 | Nakano | 370/347 |
| 2002/0058514 A1 * | 5/2002 | Senarath et al. | 455/450 |
| 2002/0191574 A1 * | 12/2002 | Taylor et al. | 370/338 |
| 2003/0008654 A9 * | 1/2003 | Senarath et al. | 455/450 |
| 2003/0083061 A1 * | 5/2003 | Robinson et al. | 455/425 |
| 2003/0096576 A1 | 5/2003 | Salonidis et al. | |
| 2003/0123401 A1 * | 7/2003 | Dean | 370/318 |
| 2005/0058151 A1 * | 3/2005 | Yeh | 370/445 |
| 2006/0046647 A1 | 3/2006 | Parikh et al. | |
| 2006/0105771 A1 * | 5/2006 | Iacono et al. | 455/446 |
| 2006/0154667 A1 * | 7/2006 | Seo et al. | 455/446 |
| 2007/0115897 A1 * | 5/2007 | Chen et al. | 370/338 |
| 2007/0121560 A1 * | 5/2007 | Edge | 370/338 |
| 2007/0183383 A1 * | 8/2007 | Bitran et al. | 370/338 |

(Continued)

FOREIGN PATENT DOCUMENTS

EP          1187503 A1 *  3/2002
WO   WO 2007124460 A1 * 11/2007

*Primary Examiner* — Ian Moore
*Assistant Examiner* — Jenee Williams

(57) ABSTRACT

The present document describes a system and method for extending a wireless communication coverage area of a cellular wireless base station transceiver (BTS) to enable control signaling and identification of mobile stations not currently within a coverage area of an existing beamform antenna pattern of the BTS, for example. A cellular BTS may scan through dead zones of coverage areas provided by the BTS to identify mobile stations not within the coverage area of the BTS, but within a possible service area of the BTS. In addition, the BTS may receive a relaying control signal from a mobile station located within the coverage area of the BTS, and the signal will indicate a location of another mobile station not within the coverage area of the BTS but within the service area of the BTS. In either example, the BTS may attempt to provide a coverage area to the mobile station located in the control signaling dead zone, for example.

10 Claims, 7 Drawing Sheets

(56) References Cited

U.S. PATENT DOCUMENTS

| | | | |
|---|---|---|---|
| 2007/0225028 A1 | 9/2007 | Nelson et al. | |
| 2007/0297358 A1* | 12/2007 | Chang et al. | 370/328 |
| 2008/0045143 A1* | 2/2008 | Yoshida et al. | 455/7 |
| 2008/0062940 A1* | 3/2008 | Othmer et al. | 370/338 |
| 2008/0075033 A1* | 3/2008 | Shattil | 370/328 |
| 2008/0123605 A1* | 5/2008 | Cho et al. | 370/338 |
| 2008/0137585 A1* | 6/2008 | Loyola et al. | 370/315 |
| 2008/0165720 A1* | 7/2008 | Hu et al. | 370/315 |
| 2008/0186902 A1* | 8/2008 | Furukoshi et al. | 370/315 |
| 2008/0186907 A1* | 8/2008 | Yagyuu et al. | 370/328 |
| 2008/0225810 A1* | 9/2008 | Buchwald et al. | 370/338 |
| 2008/0232296 A1* | 9/2008 | Shin et al. | 370/315 |
| 2009/0046628 A1* | 2/2009 | Hall | 370/328 |
| 2009/0161592 A1* | 6/2009 | So | 370/328 |
| 2009/0163214 A1* | 6/2009 | Trigui et al. | 455/446 |
| 2009/0252137 A1* | 10/2009 | Bitran et al. | 370/338 |

* cited by examiner

Beamform both control and data components

Periodically create a negated control beam pattern to search for devices

New beamforming pattern is created to accommodate new device

FIGURE 6A — When a device does not receive a control signal, the device broadcasts location FIGURE 6B — Nearby device that is covered by current beamformed pattern relays location information to network FIGURE 6C — New beamforming pattern is created to accommodate new device

SYSTEM AND METHOD FOR EXTENDING A WIRELESS COMMUNICATION COVERAGE AREA OF A CELLULAR BASE TRANSCEIVER STATION (BTS)

FIELD

The present document relates to wireless communications, and more particularly, to controlling beamforming antennas of a base transceiver station (BTS) to provide additional wireless coverage areas for the BTS.

BACKGROUND

A wireless cellular communication system uses a number of wireless transmitters to create a geographic service area of the system. The service area may be broken down into cells, which can be sized according to subscriber density and demand within a particular region. Cells can be added to accommodate growth, such as to create new cells in unserved areas or overlaying cells in existing areas, for example.

In the wireless communication system, the wireless transmitters send and receive electromagnetic signals through antennas (rather than or in addition to transmitting and receiving signals through a transmission line). Antennas couple electromagnetic energy from one medium (space) to another (e.g., wire, coaxial cable, etc.). Physical designs of antenna systems can vary, however it is generally desirable to focus radiation of electromagnetic energy (in the form of a wireless signal) in the direction of a receiving device to efficiently transmit wireless signals and to lessen interference to other radio communication networks.

Beamforming is one way to extend wireless coverage and reliability by employing multiple transmission and reception antennas to focus transmission and reception of signals. Beamforming is a signal processing technique used in antenna arrays for directional signal transmission or reception. Spatial selectivity is achieved by using adaptive or fixed receive/transmit beampatterns, for example. Beamforming can focus energy to a specific location to extend coverage/reliability to an area where a user is located.

Beamforming using directional antennas concentrates electromagnetic energy to produce a radiation pattern in one or more desired directions. For example, a directional antenna may produce a conical-shaped coverage pattern, similar to the light output pattern of a flashlight. An angle of a beam width of the coverage pattern specifies the antenna directionality. Typical beam width angles range from 90 degrees (somewhat directional) to 20 degrees (very directional).

A directional antenna beam provides a narrow coverage pattern, which may allow for efficient transmission of wireless signals. However, since a directional antenna provides such a localized coverage pattern, an endpoint device should be within the localized coverage pattern (or possibly within a close proximity) in order to receive transmitted signals. This is because wireless devices may require control signaling messages to establish communication links, and even if the directional antenna radiates in directions slightly off-line from the endpoint device, little if any of the signals may be received in those off-line locations. Thus, if a user is not initially located within a direction of a coverage area of the directional antenna beam, the user may not be able to receive control signals needed to acquire service from the directional antenna. As a result, gaps between the coverage areas in a directional antenna system are dead-zones where users may not receive service.

SUMMARY

The present document describes a system and method for extending a wireless communication coverage area of a cellular wireless base station transceiver (BTS) to provide control signaling and to enable identification of mobile stations not currently within a coverage area of an existing beamform antenna pattern of the BTS, for example. A cellular BTS may scan through dead zones of coverage areas provided by the BTS to identify mobile stations not within the coverage area of the BTS, but within a possible service area of the BTS. In addition, the BTS may receive a relayed control signal from a mobile station located within the coverage area of the BTS, and the signal will indicate a location of another mobile station not within the coverage area of the BTS but within the service area of the BTS. In either example, the BTS may attempt to provide a coverage area to the mobile station that may be located in a control signaling dead zone, for example.

In one aspect, the present document describes a method of extending a wireless communication coverage area of a cellular base transceiver station (BTS). The method includes a BTS providing a beamformed coverage area pattern on both control signaling and data communication. The beamformed coverage area pattern indicates a geographic area over which control component communication and data traffic communication between a mobile station and the BTS can occur. The method also includes scanning through areas to which the BTS can provide a coverage area and that are not included within the beamformed coverage area pattern (e.g., a mobile station located within one of these areas will not be able to establish a communication link with the BTS). If a second mobile station is located within one of the areas to which the BTS can provide a coverage area and that is not included within the beamformed coverage area pattern, a beamformed coverage area is extended to the second mobile station.

In another aspect, the method of extending a wireless communication coverage area of a cellular base transceiver station (BTS) comprises receiving from a first mobile station located within the beamformed coverage area pattern, information broadcast by a second mobile station not located within the beamformed coverage area pattern indicating a location of the second mobile station. In this aspect, the method further includes making a determination of whether the second mobile station is located within a service area of the BTS, and based on the determination, extending a beamformed coverage area to the second mobile station based on the location information relayed by the first mobile.

In still another aspect, the present document describes a computer readable medium having stored therein instructions executable by a computing device to cause the computing device to perform the functions of providing a beamformed coverage area pattern. The beamformed coverage area pattern indicates a geographic area over which control component communication and data traffic communication between a mobile station and the BTS can occur. The functions further include scanning through areas to which the BTS can provide a coverage area and that are not included within the beamformed coverage area pattern. If a second mobile station is located within one of the areas to which the BTS can provide a coverage area and that is not included within the beamformed coverage area pattern, a beamformed coverage area is extended to the second mobile station.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
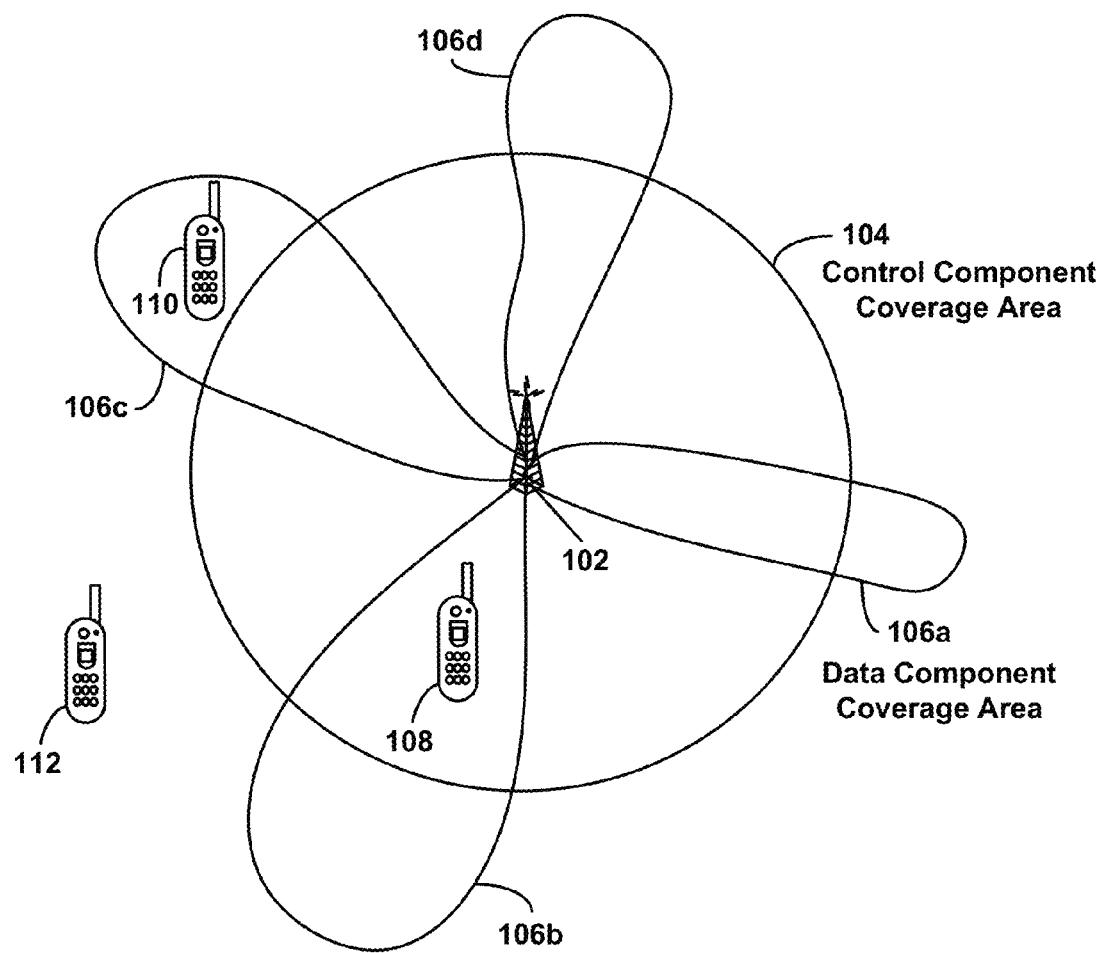
FIG. 1 illustrates example conceptual antenna patterns produced by antennas of a cellular base transceiver station (BTS).

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

FIG. 1 illustrates conceptual antenna patterns produced by antennas of a cellular BTS 102. As shown, the BTS 102 provides both a control component coverage area 104 and data component coverage areas 106a-d. The BTS 102 may include one or more antennas to produce the antenna patterns or antenna-beams. For example, an omni-directional antenna may be operated to produce the control component coverage area 104, and beamforming antennas may be operated to produce the data component coverage areas 106a-d. Alternatively, beamforming antennas may be used to produce both the control component coverage area 104 and data component coverage areas 106a-d.

The antenna patterns produce an air interface that defines a respective coverage area, and when a mobile device is positioned within such a coverage area, the air interface provides a communication path between the mobile device and the BTS 102. The mobile device can then communicate through this path with entities on a wireless communication system via the BTS 102.

Thus, to receive wireless communications from the BTS 102, a mobile device will need to be within a coverage area. For example, the BTS can communicate with mobile devices as long as the mobile devices are within an acceptable range of the BTS because radio energy between mobile devices and the BTS dissipates over distance.

In FIG. 1, the control component coverage area 104 produced by the BTS 102 indicates a coverage area over which the BTS 102 transmits or broadcasts control information needed by a mobile device to enter the network and to begin communication with the BTS 102. The data component coverage areas 106a-d indicate coverage areas over which the BTS 102 enables communication with the network by a mobile device for exchange of data traffic. In this configuration, the BTS 102 uses separate antennas for control channel communication and for data traffic communication.

In FIG. 1, mobile device 108 is within the control component coverage area 104 and will be able to communicate with the BTS 102 to connect to the network. Note that the mobile device 108 is also within the data component coverage area 106b formed by a directional antenna so that after connecting to the network, the mobile device 108 will readily be able to communicate data traffic with the BTS 102.

Conversely, mobile device 110 is not within the control component coverage area 104, and thus, the mobile device 110 will not be able to connect to the network even though the mobile device 110 is within the data component coverage area 106c. This is because the mobile device 110 will not receive the control signaling and synchronization information broadcast by the BTS 102 since the mobile device 110 is outside the control component coverage area 104. Further, even if the mobile device 110 had previously connected to the network (by being present in the control component coverage area 104) and now resides in the data component coverage area 106c, the mobile device 110 may still not be able to communicate data traffic with the BTS 102 because the mobile device 110 may be required to have constant control component communication with the BTS 102, for example.

However, in FIG. 1, mobile device 112 is not within any coverage area, and thus, will not be able to communicate with the BTS 102.

To begin communications with the BTS 102, a mobile device performs the network entry synchronization by exchanging control messages with the BTS 102 while the mobile device is located within the control component coverage area 104. Control messages include information used by the mobile device and the BTS 102 to send and receive wireless signals, such as a network identification number (ID), a BTS ID, and other parameters that the mobile device will use to transmit signals. Examples of other parameters include a transmission power level, timing information, user authentication or other network specific information. Thus, before the mobile device can connect to an underlying network through the BTS 102 and transmit data, the mobile device exchanges information with the network over a control channel to enter the network.

The arrangement illustrated in FIG. 1 is one example. The BTS 102 may also be configured to use one antenna for both control channel and data traffic communication, for example. But, using separate antennas for control channel and data traffic communication may enable more robust or efficient communication for each. For example, by using antennas dedicated for specific communications, each antenna may handle less traffic, enabling faster data transfer and network connections.

Examples of control channel information may depend on a configuration of the wireless network. In a global system for mobile communications (GSM) network, two associated control channels (ACCH) are used, for example, one for a user's traffic channel and one for a dedicated signaling channel. The two channels include a slow associated control channel (SACCH) and a fast associated control channel (FACCH). As another example, in general packet radio service (GPRS)

operation, an ACCH is allocated in conjunction with a packet data traffic channel (PDTCH) and is referred to as a packet associated control channel (PACCH), for example.

Figure 2:
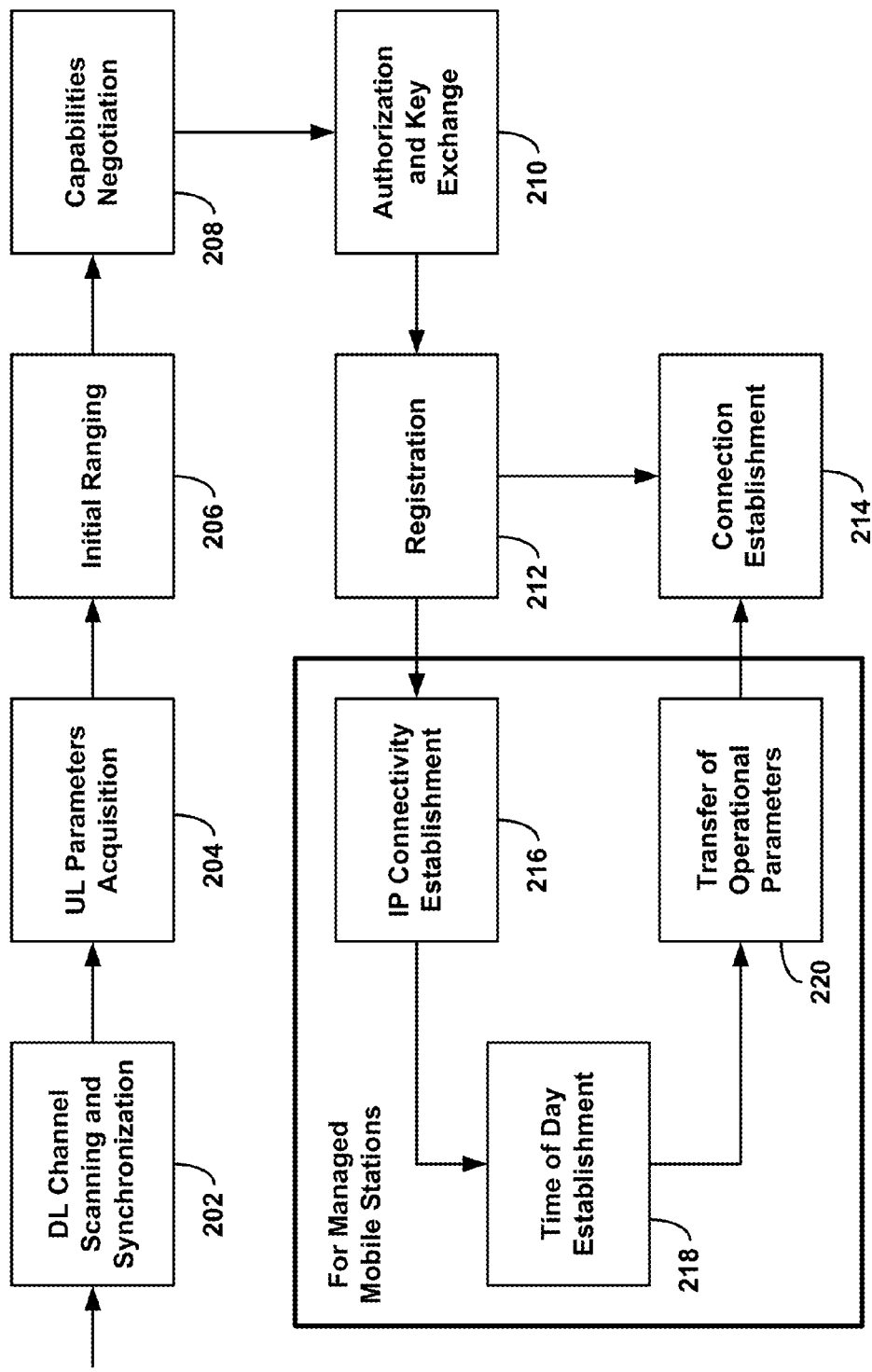
FIG. 2 is a block diagram illustrating one example of signaling performed over a control channel by a mobile device or mobile station (MS) for entry into a network.

FIG. 2 is a block diagram illustrating one example of signaling performed over a control channel by a mobile device or mobile station (MS) for entry into a network. When an MS enters (or reenters) a wireless network, a network synchronization process occurs. First, the MS scans a downlink (DL) channel (e.g., communication from a BTS to the MS) and synchronizes with the BTS, as shown at block 202. An MS may be able to receive information over the DL channel once the MS is within range of a BTS control component coverage area.

After synchronizing with the BTS, the MS acquires transmit parameters for reverse or uplink (UL) transmission (e.g., communication from the MS to the BTS), as shown at block 204. For example, an uplink channel descriptor (UCD) message is sent to the MS and includes a medium access control (MAC) management message describing physical characteristics of an uplink. The MS then performs initial ranging to acquire correct timing offsets and power adjustments for signal transmission, as shown at block 206. For example, the MS may extract an initial ranging-interval time slot from an uplink mobile application part (MAP) message. If the MS cannot complete initial ranging successfully, the MS may begin scanning for a new DL channel, for example.

A capabilities negotiation process then begins when the MS sends a message containing capabilities of the MS to the BTS, as shown at block 208. The BTS responds with a message containing capabilities that the BTS has in common with the MS. If privacy key management (PKM) is enabled at both the MS and the BTS, the next step is to perform an authorization and key-exchange procedure so that the MS can register with the network, as shown at block 210. The BTS may send back a registration response message containing secondary management caller identity delivery (CID) if the MS is a managed mobile station (i.e., a portion of controls or signaling of the MS is controlled by the network), for example, as shown at block 212. After a managed MS obtains the secondary management CID, the MS becomes "manageable."

If the MS is not managed, after the MS has registered with the network, the MS service-flow connections are established, as shown at block 214.

When a managed MS enters the network, the next step is to establish Internet Protocol (IP) connectivity, as shown at block 216, by using an assigned secondary management connection, such as by either invoking the dynamic host configuration protocol (DHCP) or using the IP stateless address auto-configuration depending on information provided by the BTS registration response message. If the MS uses mobile IP (MIP), the MS can secure an address by using a secondary management connection with MIP. If DHCP is used to establish IP connectivity, a managed MS can also establish the time of day so that the management system can time-stamp certain events, as shown at block 218. Although the time of day may not be needed for the registration to complete successfully, the time of day is often required to keep the connection operational. Finally, the managed MS acquires operational parameters with trivial file transfer protocol (TFTP), as shown at block 220. After a managed MS has obtained operational parameters, or after an unmanaged MS has registered with the network, the MS service-flow connections are established, as shown at block 214.

FIG. 2 illustrates one example of an exchange of signals and information between an MS and a BTS for network entry by the MS. Other information may be exchanged and in a different order depending on a type of the network. Other information may include frequency and channel assignments, type of radio modulation, maximum power levels, modulation parameters, messaging protocols, call-processing sequences, etc.

Using a BTS configuration as shown in FIG. 1, the mobile device 110 within a coverage area of a data component coverage area 106c may not be able to communicate with the network since the mobile device 110 is not within the control component coverage area, and thus, will not receive control component information broadcast by the BTS 102. Beamforming antennas for data communications can extend range and coverage of the BTS 102, however, mobile devices need to be able to enter the network to take advantage of the extended data coverage area.

Figure 3:
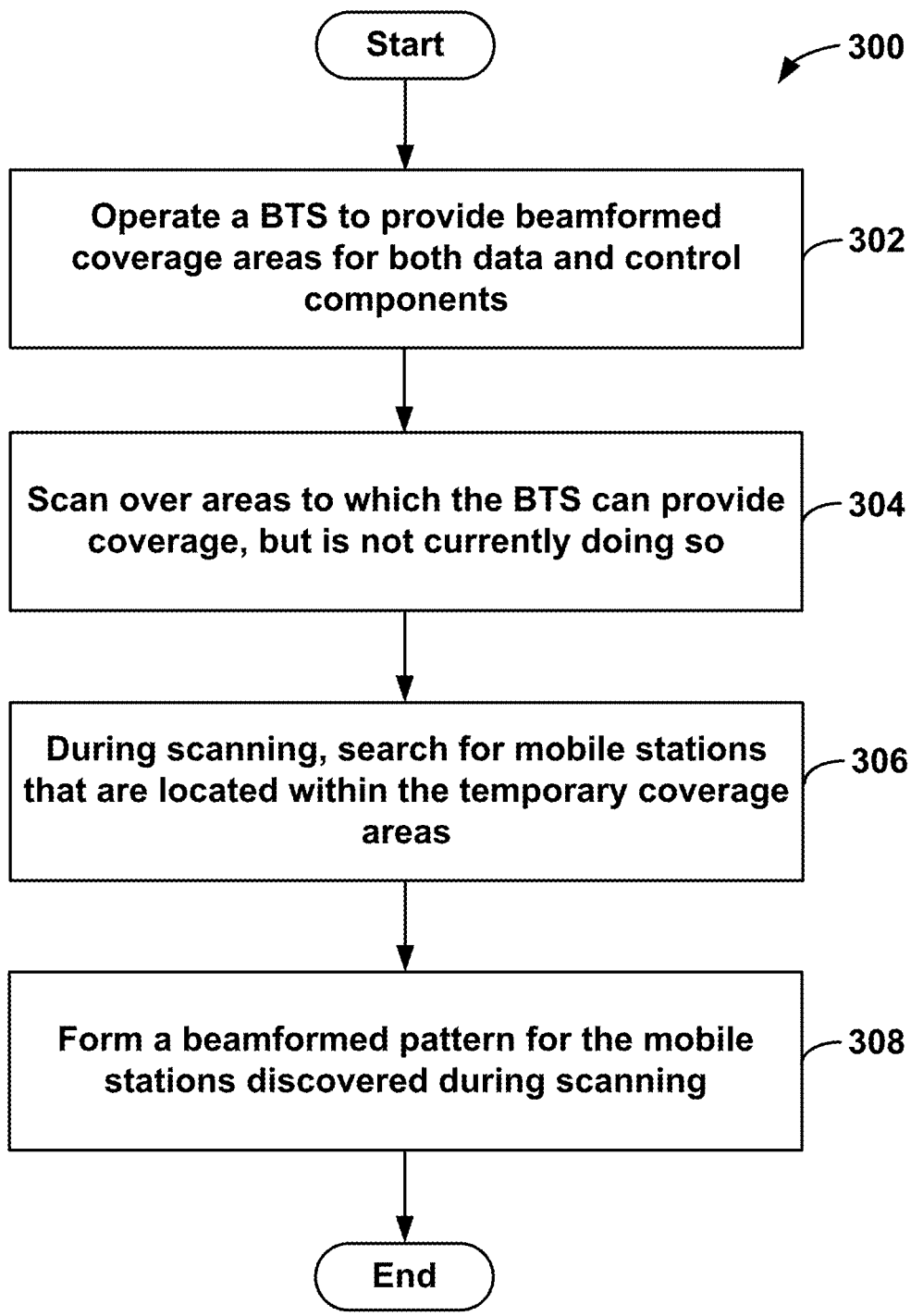
FIG. 3 is a flowchart depicting example steps of a method for extending control coverage areas of a BTS.

FIG. 3 is a flowchart depicting example steps of a method 300 for extending control coverage areas of a BTS. It should be understood that the flowchart shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. In addition, each block may represent circuitry that is wired to perform the specific logical functions in the process. Alternative implementations are included within the scope of the example embodiments of the present document in which functions may be executed out of order from that shown or discussed, including substantially concurrent or in reverse order, depending on the functionality involved, as would be understood by those reasonably skilled in the art.

The method 300 may be performed to identify mobile stations located out of existing control component coverage areas, but within available coverage areas that can be provided by the BTS, and subsequently to extend the control coverage areas of the BTS, for example. Thus, the method 300 identifies mobile stations located within a service area of the BTS. The service area includes a geographic area to which the BTS may provide coverage areas enabling wireless communication between the BTS and a mobile station.

Initially, as shown at block 302, a BTS may be operated to provide beamformed coverage areas for both data and control components. For example, a single beamformed radiation pattern may enable an MS to communicate with the BTS over both the control and data traffic channels. The single beamformed radiation pattern may include two beams overlapping each other, and one beam may be generated by an antenna for control channel information and another beam may be generated by a separate antenna for data channel information. Thus, antenna beams for both control and traffic channels can be shaped in the same manner so that a resulting combined radiation pattern operates to carry both traffic and control information. One beamform radiation pattern can operate to provide coverage to multiple mobile stations, for example.

The BTS may form multiple combined beamformed radiation patterns, for example, however, the radiation patterns may not extend to all areas for which the BTS may provide coverage. For example, because energy is focused to a specific location using beamforming, if a new mobile station attempts to access the network and is not located in the beamformed radiation pattern, the mobile station will not receive control signals, and thus, will not be able to access the network. Thus, an MS could be located within range of the BTS but outside of a coverage area.

The BTS may scan over areas to which the BTS can provide coverage, but is not currently doing so, as shown at block 304. For example, the BTS may temporarily provide beamformed radiation patterns in all areas where no patterns are present. By doing so, control component information can be uniformly broadcast so that potential mobile stations can enter the network. The BTS may provide temporary beamformed radiation patterns in a sequential manner, by providing one new beamformed radiation pattern at a time, or in a parallel manner by providing multiple new beamformed radiation patterns all at once. If done so in a sequential manner, an antenna beam may rotate throughout potential coverage areas in a clockwise manner to provide a temporary beamformed coverage area in each of a coverage area to which the BTS may provide service. Further, the BTS may scan in a periodic manner so as to provide the temporary beamformed coverage area once every few seconds, for example.

When performing the scanning function, the BTS may only provide a control component coverage area in areas where existing antenna beam patterns are not present to search for new mobile stations to enter the network. Thus, the BTS may create a negated control beam pattern, for example, to provide coverage in areas where no coverage is currently provided. The BTS may alternatively provide a combined data and control component coverage area, for example, during the scanning function.

Further, the BTS may have many beamforming antennas (e.g., such as four total on a tower of a BTS), and with multiple antennas, many different coverage areas can be created. When performing the scanning function, the BTS may not create a new beamformed patterns, but alternatively may temporarily enlarge existing beamformed patterns to extend coverage areas of the BTS, for example. If existing beamformed patterns are temporarily enlarged, the beamformed patterns may be enlarged simultaneously to provide a substantially omni-directional coverage pattern, or sequentially to provide additional coverage areas not at the same time, for example.

During the scanning function, the BTS will search for new mobile stations that may be located within the temporary coverage areas, as shown at block 306. For example, if an MS is present within a temporary coverage area, the MS may begin signaling to enter the network (as shown, for example, in FIG. 2). If the BTS receives a signal from an MS within a temporary coverage area, the BTS determines that a new MS is located within the temporary coverage area. Once a new MS is discovered during the scanning function, a beam pattern is formed to provide a coverage area for the new MS, as shown at block 308. The BTS may continue scanning in a periodic fashion or in a predetermined manner based on availability of antennas not in use or based on a number of existing dead zones surrounding the BTS, for example.

The method 300 operates to provide a control component and data traffic coverage areas where none are present to extend coverage of a BTS. Further, an MS may be required to be within a control component coverage area not just to enter a network, but even after setup occurs, for example. Thus, both control component and data component coverage areas can be extended using beamforming for a duration of operation of an MS within the coverage areas.

Figures 4A, 4B, 4C:
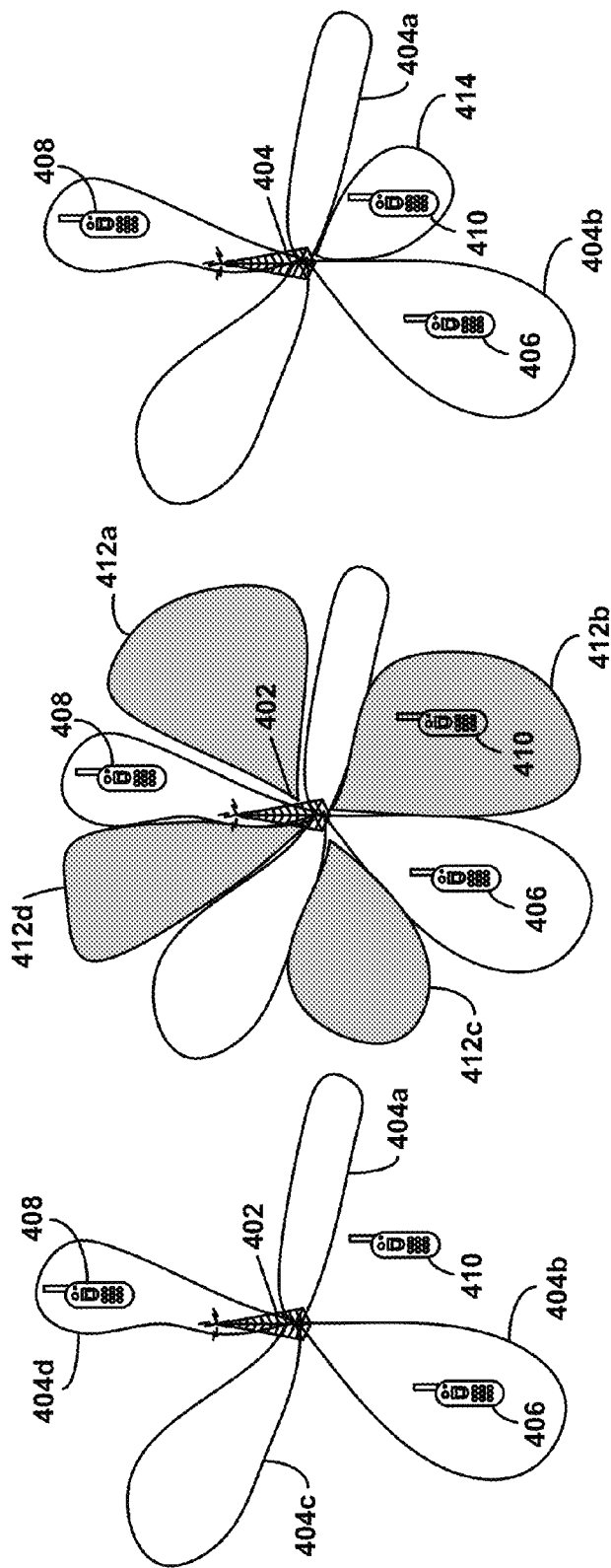
FIGS. 4A-4C illustrate example conceptual antenna patterns produced by antennas of a BTS to perform the method of FIG. 3.

FIGS. 4A-4C illustrate example conceptual antenna patterns produced by antennas of a base station transceiver (BTS) 402 to perform the method 300 of FIG. 3. For instance, FIG. 4A illustrates the BTS 402 providing antenna patterns 404a-d each of which enables an MS to communicate both control and data information with the BTS 402. Mobile stations 406 and 408 are each within a coverage area and can communicate both control and data information with the BTS 402. Mobile station 410, however, is not located within a beamformed coverage area and will not be able to communicate with the BTS 402. Geographic areas between the antenna patterns 404a-d may be referred to as dead zones of the BTS 402, since a mobile station located in these geographic areas will not be able to communicate with the BTS 402.

FIG. 4B illustrates temporary coverage patterns 412a-d created by the BTS 402 in a periodic fashion. For example, the BTS 402 may provide coverage pattern 412a for 10 seconds, and then remove the coverage pattern 412a and subsequently provide coverage pattern 412b for 10 seconds, and so on. In this manner, the BTS 402 can provide a temporary coverage pattern in areas of the dead zones for the BTS 402 in a sequential manner to rotate through all dead zones, for example. Other scanning patterns may also be provided by the BTS 402 so as to provide a coverage pattern for a given amount of time within each of a dead zone of the BTS 402. Further, the scanning function may be performed periodically by the BTS 402, so that the BTS 402 scans through dead zones in a scanning pattern once every few seconds, a minute, 10 minutes, 30 minutes, etc., based on programmed functions of the BTS 402.

Once the BTS 402 provides coverage pattern 412b, the BTS 402 may identify the mobile station 410 that is not currently being served by the BTS 402 by receiving a signal from the mobile station 410. The temporary coverage patterns 412a-d at least enable control component communication between the mobile station 410 and the BTS 402 so that the mobile station 410 may connect to the network.

FIG. 4C illustrates a new coverage pattern 414 created by the BTS 402 for the mobile station 410 discovered during scanning. The new coverage pattern 414 may exist for as long as the mobile station 410 is in communication with the BTS 402, or as long as the mobile station 410 is located within the coverage area 414, for example. Further, instead of creating the new coverage pattern 414, the BTS 402 may alternatively enlarge either of existing coverage patterns 404a or 404b to extend coverage to the mobile station 410, for example.

The BTS 402 may then continue a scanning function to search for additional mobile stations not currently served by the BTS 402, but located within a potential coverage (or service) area of the BTS 402. FIGS. 4A-4C illustrate that an overall uniform omni-directional coverage area is provided by the BTS 402 during the scanning function, but not simultaneously due to delay and rotation of coverage areas provided during the scanning function, for example. Once additional mobile stations are found and more coverage areas are provided, as shown in FIG. 4C, there will be less dead zones surrounding the BTS 402. Thus, the scanning function may be performed more quickly by scanning through less geographic areas, however, fewer antennas may also be available to perform the scanning function as well (since more antennas are in use). Thus, rather than providing new antenna beamforms to scan through the remaining areas, existing beamforms may be enlarged or reshaped to perform the scanning function, for example.

Figure 5:
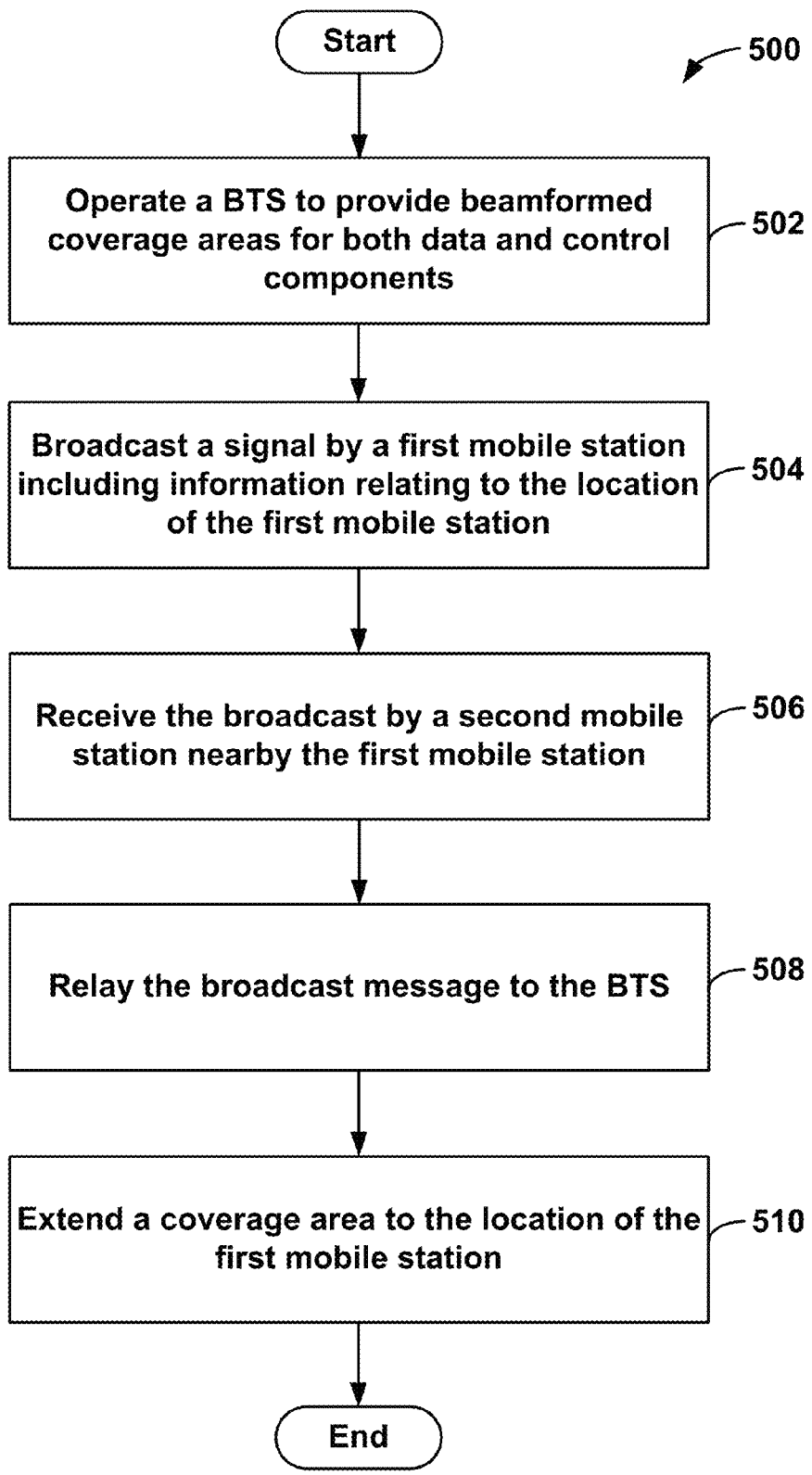
FIG. 5 is a flowchart depicting example steps of another method for extending control coverage areas of a BTS.

FIG. 5 is a flowchart depicting example steps of another method 500 for extending control coverage areas of a BTS. The method 500 may be performed by a processor or computing device for implementing specific logical functions or steps in the method. The logical functions may be stored as program code on any type of computer readable medium, for example, such as a storage device including a disk or hard drive.

Initially, as shown at block 502, a BTS may be operated to provide beamformed coverage areas for both data and control components. For example, a single beamformed radiation pattern may enable an MS to communicate with the BTS over both the control and data traffic channels. If a mobile station attempts to access the network and is not located in the beamformed radiation pattern, the mobile station will not be able to access the network because the mobile station will not receive the control signals.

A first mobile station may be located outside of a beamformed radiation pattern of the BTS, and may also be searching for service from a BTS. Once the first mobile station is unable to receive a signal from a BTS (possibly after searching for a DL channel for 5 seconds, 10 seconds, etc.), the first mobile station may responsively broadcast a signal including information relating to the location of the mobile station, as shown at block 504. Because the first mobile station is outside of a coverage area of the BTS, the first mobile station may not be able to communicate with the wireless communication network. Thus, one way for the first mobile station to determine a location of the mobile station is by querying an internal module, e.g., a global positioning system (GPS) receiver, to receive an indication of the mobile station's current position. The GPS receiver can receive from a GPS satellite system an indication of the mobile station's position.

A second mobile station nearby the first mobile station may receive the broadcast from the first mobile station, as shown at block 506. The second mobile station also may currently be within a beamformed coverage area of the BTS, and thus, the second mobile station may relay the broadcast message received from the first mobile station to the BTS, as shown at block 508. Alternatively, the second mobile station may simply relay or send a message indicating the location of the first mobile station to the BTS.

If the first mobile station is located in an area to which the BTS may provide a coverage area, the BTS will responsively extend a coverage area to the location of the first mobile station, as shown at block 510, to enable the first mobile station to communicate with the BTS. The extended coverage area may be a control component coverage area, or both a control component and a data component coverage area. The BTS may extend coverage to the first mobile station by forming a new beamformed coverage area, or by adjusting a pattern of an existing beamformed coverage area, for example.

The method 500 is an example of an information relaying method to inform a BTS of mobile devices within a possible service area of the BTS, but not currently receiving service from the BTS. The information is relayed by a mobile station located within a coverage area of the BTS. When a mobile station establishes communication with the network by scanning for a control channel (as shown in FIG. 2 at block 202, for example), the mobile station may also scan other wireless channels with regard to any mobile stations in proximity to itself In this manner, the mobile station may receive signals broadcast by mobile stations in proximity, and relay the signals to the BTS, for example.

Communication between mobile stations to relay signals may not be continuous. For instance, a mobile station may simply relay a signal received from a nearby mobile station to a BTS. Communication between the mobile stations may end at that point, for example, so that a mobile station does not function as a proxy network interface for another mobile station.

Figure 6:
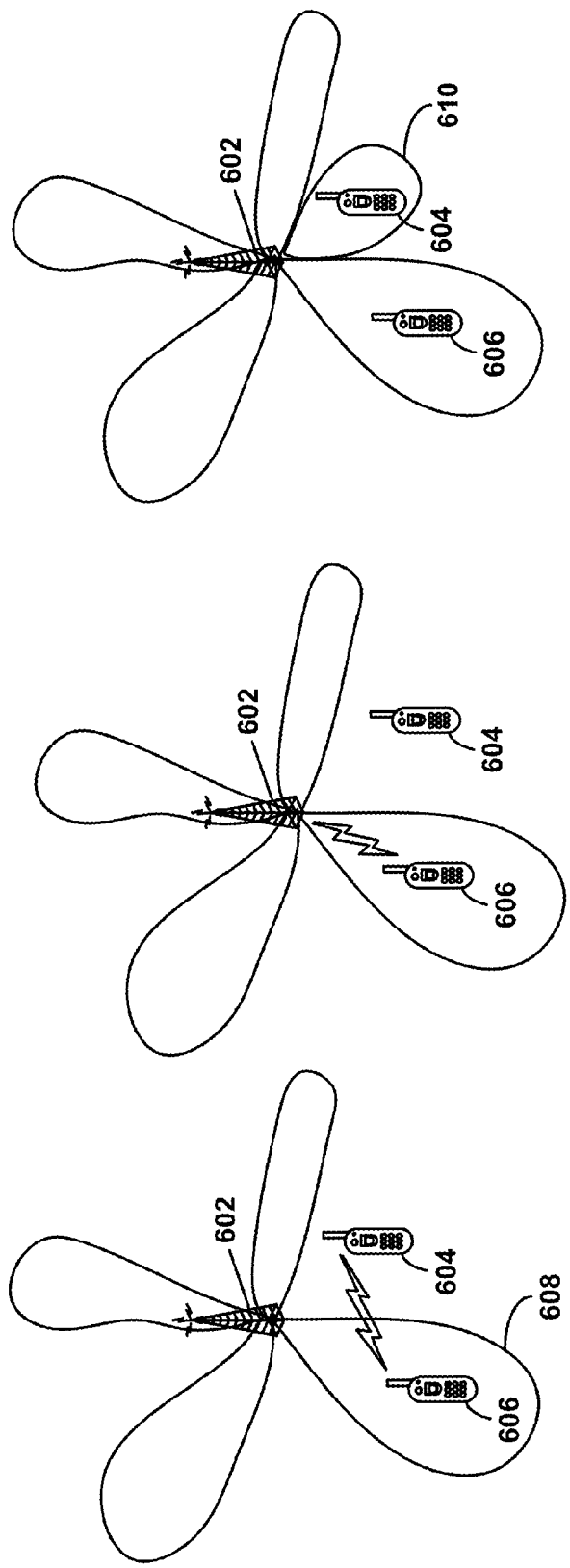
FIGS. 6A-6C illustrate example conceptual antenna patterns produced by antennas of a BTS to perform the method of FIG. 5.

FIGS. 6A-6C illustrate example conceptual antenna patterns produced by antennas of a base station transceiver (BTS) 602 to perform the method 500 of FIG. 5. As shown in FIG. 6A, a mobile station 604 may not be within a coverage area currently being provided by the BTS 602, and thus, the mobile station 604 may broadcast a control signal including information indicating a location of the mobile station 604. A nearby mobile station 606 will receive the broadcast from the mobile station 604. The nearby mobile station 606 is within a coverage area 608 provided by the BTS 602.

As shown in FIG. 6B, the nearby mobile station 606 will relay the broadcast from the mobile station 604 to the BTS 602. Alternatively, the nearby mobile station 606 may extract the location information from the broadcast, and send a signal to the BTS 602 indicating the location of the mobile station 604, for example.

As shown in FIG. 6C, the BTS 602 will receive the information relayed from the nearby mobile station 606 and provide a beamformed coverage area to the location of the mobile station 604, if possible. For example, the BTS 602 will determine if the mobile station 604 resides in an area to which the BTS 602 can extend coverage by reference to a data table indicating geographic coverage zones of the BTS 602. If the mobile station 604 resides in a geographic coverage zone of the BTS 602, the BTS 602 will extend a coverage area to the mobile station 604 either by providing a new beamformed coverage area to the mobile station 604 or enlarging/resizing an existing beamformed coverage area to extend to the location of the mobile station 604. FIG. 6C illustrates the BTS 602 creating a new beamformed coverage area 610 for the mobile station 604.

The BTS 602 may include a data table indicating geographic areas to which antennas of the BTS 602 can provide a coverage area. The information indicating the location of the mobile station 604 may include geographic coordinates (such as latitude and longitude coordinates), BTS cell/sector information, or other location information as appropriate. The BTS 602 may be able to extend a coverage area further or provide a more focused coverage area to a specific location when a small number of mobile stations are in communication with the BTS 602, for example.

Figure 7:
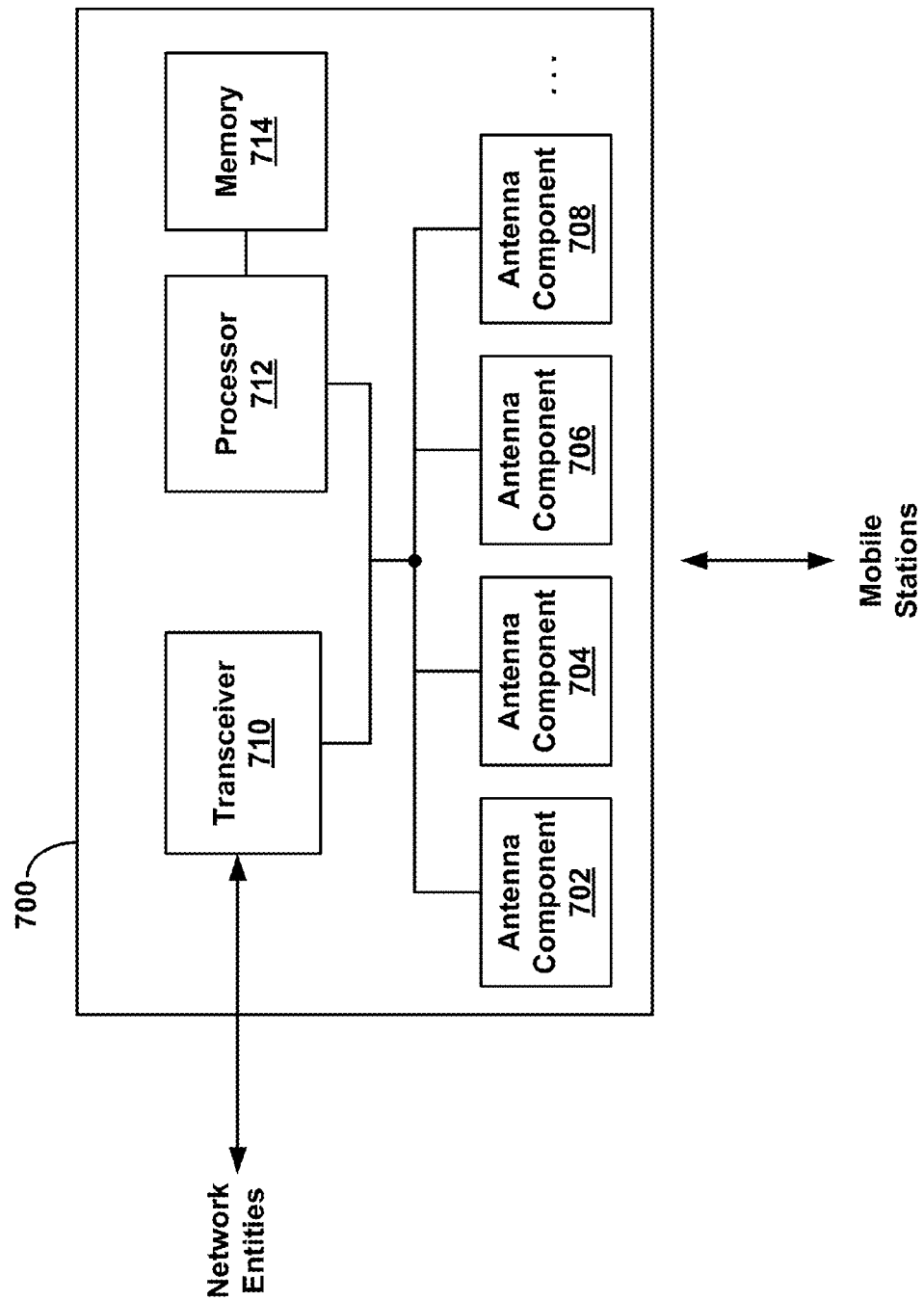
FIG. 7 is a block diagram illustrating an example system for extending a coverage area of a BTS.

FIG. 7 is a block diagram illustrating an example system 700 for extending a coverage area of a BTS. In one example, the system 700 may take the form of a BTS. The system 700 includes antenna components 702, 704, 706, and 708, each coupled to a transceiver 710 and a processor 712, as well as a memory 714 connected to the processor 712. The system 700 may include other components not shown as well, such as a power amplifier, a combiner, a duplexer, etc., depending on an application of the system 700.

The antenna components 702, 704, 706, and 708 may receive signals wirelessly from mobile stations and send the signals to the transceiver 710 and the processor 712. The antenna components 702, 704, 706, and 708 can be operated by the processor 712 to provide a coverage area for the system 700. The antenna components 702, 704, 706, and 708 may be operated as beamforming antennas to change directionality of a coverage area. When transmitting signals, the transceiver 710 or processor 712 may control a phase and relative amplitude of a signal being transmitted at each of the antenna component 702, 704, 706, and 708 to create a pattern of constructive and destructive interference in a wavefront to form a desired coverage area. By introducing a phase shift to form a desired coverage area, the antenna components 702, 704, 706, and 708 may operate as a phased array. When receiving signals, a signal from each of the antenna components 702, 704, 706, and 708 may be amplified by a different amount to achieve desired coverage patterns, for example.

The transceiver 710 may receive signals from the antenna components 702, 704, 706, and 708 and send the signals to network entities, such as a base station controller (BSC), a mobile switching center (MSC), or a wireless communication transport network, for example. The transceiver 710 may also receive signals from the network entities and send the signals to the antenna components 702, 704, 706, and 708 for wireless transmission to mobile stations.

The processor 712 may operate the system 700 to execute the method 300 shown in the flowchart of FIG. 3, the method 500 shown in the flowchart of FIG. 5, or both, for example. The processor 712 may direct the antenna components 702, 704, 706, and 708 to provide both stationary coverage patterns and coverage patterns that rotate throughout all potential service areas of the system 700.

Further, the processor 712 may receive a relay signal from a mobile station indicating a location of a mobile station requesting service by the system 700. The processor 712 may access the memory 714 to determine if the mobile station is located within a geographic location of a service area of the system 700, and if so, the processor 712 may direct any of the antenna components 702, 704, 706, and 708 to extend coverage to the location of the mobile station. The processor 712 may direct any of the antenna components 702, 704, 706, and 708 to extend coverage by adjusting a current coverage of the antenna components 702, 704, 706, and 708, or by providing a new directional coverage area, for example.

The system 700 may perform the scanning function as shown in the method of 300, and simultaneously, perform the method 500 to provide new coverage areas based on signals received from mobile stations located within existing coverage areas. Thus, the system 700 operates to extend coverage areas to mobile stations that are not currently located within an existing coverage area, but that are located within a service area of the system 700, for example.

The present disclosure is not to be limited in terms of the particular embodiments described in this disclosure, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. Further, many of the elements that are described are functional entities may be implemented as discrete or distributed components or in conjunction with other components, in any suitable combination and location.

What is claimed is:

1. A method of extending a wireless communication coverage area of a cellular base transceiver station (BTS), comprising:
   providing a beamformed coverage area pattern, the beamformed coverage area pattern indicating geographic areas over which control component communication and data traffic communication between a mobile station and the BTS is configured to occur, wherein the control component communication includes network synchronization signaling between the BTS and the mobile station for entry into a network;
   while providing the beamformed coverage area pattern, the BTS scanning through areas by providing a temporary coverage area in the areas to which the BTS is configured to provide a coverage area and that are not included within the beamformed coverage area pattern, wherein the temporary coverage area results in a control beam pattern to provide a control component communication coverage area in a manner opposite of where the control component communication coverage is provided within the beamformed coverage area pattern;
   identifying a second mobile station located within one of the areas to which the BTS is configured to provide the coverage area and that is not included within the beamformed coverage area pattern, wherein the second mobile station resides in the temporary coverage area that enables the control component communication; and
   extending a beamformed coverage area to the second mobile station to enable control component communication and data traffic communication between the second mobile station and the BTS.

2. The method of claim 1, wherein scanning comprises the BTS uniformly broadcasting control component information.

3. The method of claim 1, wherein scanning comprises providing temporary coverage areas in a sequential manner to rotate a temporary coverage area through previous areas to which the BTS is configured to provide the coverage area and that are not included within the beamformed coverage area pattern.

4. The method of claim 1, further comprising performing the step of scanning periodically.

5. The method of claim 1, wherein identifying a mobile station within one of the areas to which the BTS is configured to provide the coverage area and that is not included within the beamformed coverage area pattern comprises receiving a network synchronization signal from the second mobile station.

6. The method of claim 1, wherein extending the beamformed coverage area to the second mobile station comprises providing a new beamformed coverage area pattern that enables control component communication and data traffic communication between the second mobile station and the BTS.

7. The method of claim 1, wherein extending the beamformed coverage area to the second mobile station comprises enlarging the beamformed coverage area pattern to a location of the second mobile station.

8. A non-transitory computer readable medium having stored therein instructions executable by a computing device to cause the computing device to perform the functions of:
   providing a beamformed coverage area pattern, the beamformed coverage area pattern indicating geographic areas over which control component communication and data traffic communication between a mobile station and a cellular base transceiver station (BTS) is configured to occur, wherein the control component communication includes network synchronization signaling between the BTS and the mobile station for entry into a network;
   while providing the beamformed coverage area pattern, causing the BTS to scan through areas by providing a temporary coverage area in the areas to which the BTS is configured to provide a coverage area and that are not included within the beamformed coverage area pattern, wherein the temporary coverage area results in a control beam pattern to provide a control component communication coverage area in a manner opposite of where the control component communication coverage is provided within the beamformed coverage area pattern;
   identifying a second mobile station located within one of the areas to which the BTS is configured to provide the coverage area and that is not included within the beamformed coverage area pattern, wherein the second mobile station resides in the temporary coverage area that enables the control component communication; and extending a beamformed coverage area to the second mobile station to enable control component communication and data traffic communication between the second mobile station and the BTS.

9. The non-transitory computer readable medium of claim 8, wherein the function of identifying the second mobile station located within one of the areas to which the BTS is configured to provide the coverage area and that is not included within the beamformed coverage area pattern further comprises:

receiving from a first mobile station located within the beamformed coverage area pattern, information broadcast by the second mobile station not located within the beamformed coverage area pattern indicating a location of the second mobile station.

10. The non-transitory computer readable medium of claim 9, wherein the functions further comprise:

making a determination of whether the second mobile station is located within a service area of the BTS; and based on the determination, extending a beamformed coverage area to the second mobile station.

\* \* \* \* \*